United States Patent [19]
Grobmann et al.

[11] 3,874,891
[45] Apr. 1, 1975

[54] DISPERSING AGENTS FOR THE FINE DISTRIBUTION AND STABILISATION OF DYES

[75] Inventors: Max Grobmann; Karl-Hermann List, both of Frankfurt am Main; Heinz Uhrig, Steinbach,Taunus, all of Germany

[73] Assignee: Farbwerke Hoechst Aktiengesellschaft vormals Meister Lucius & Bruning, Frankfurt, Germany

[22] Filed: Feb. 22, 1973

[21] Appl. No.: 334,780

[30] Foreign Application Priority Data
Feb. 25, 1972 Switzerland............................ 2729/72

[52] U.S. Cl. ............................................ 106/308 S
[51] Int. Cl. ........................ C08h 17/00, C09c 3/02
[58] Field of Search ........ 106/308 S, 308 Q, 288 Q; 260/457

[56] References Cited
UNITED STATES PATENTS

| | | | |
|---|---|---|---|
| 2,106,716 | 2/1938 | Bruson | 260/457 |
| 2,143,759 | 1/1939 | Bruson et al. | 260/457 |
| 3,252,809 | 5/1966 | Somers | 106/308 S |

Primary Examiner—Winston A. Douglas
Assistant Examiner—J. V. Howard
Attorney, Agent, or Firm—Curtis, Morris & Safford

[57] ABSTRACT

A dye and pigment dispersion containing a sulfuric acid semi-ester of the formula

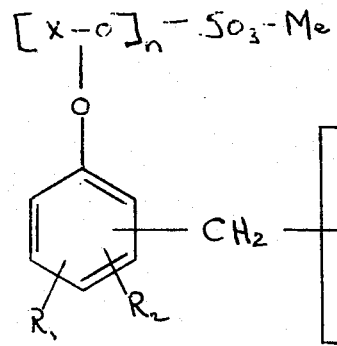
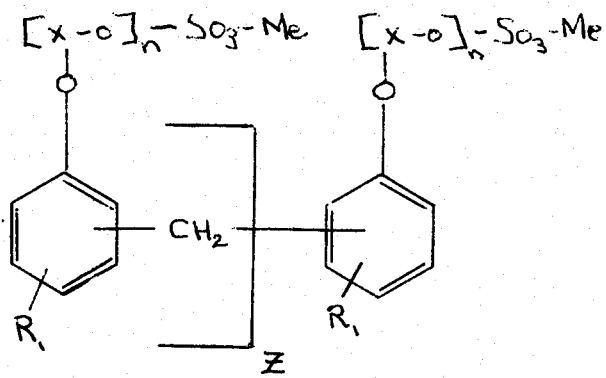

in which X is ethylene or propylene, $R_1$ alkyl of 4 to 14 carbon atoms, $R_2$ hydrogen or alkyl of 4 to 14 carbon atoms, $n$ an integer of 2 to 25, $z$ zero or an integer of 1 to 8 and Me hydrogen, alkali, alkaline earth metal, an ammonium ion or a radical of an organic base, and a process for preparing it by grinding the dye or pigment in the presence of an aqueous solution of said sulfuric acid semi-ester. The dispersing agents obtained have a good dispersing effect and tinctorial strength and give a neutral reaction in contrast to most of the known anionic dispersing agents.

2 Claims, No Drawings

DISPERSING AGENTS FOR THE FINE DISTRIBUTION AND STABILISATION OF DYES

The present invention relates to dispersing agents to be used for the fine distribution and stabilization of dyestuffs.

Demands on the finish of pigments and textile dyes, especially of disperse dyes for synthetics, having been considerably raised over recent years owing to novel dyeing methods. Especially high requirements as to the fine distribution and stability of dispersions have to be met in the dyeing of wound packages.

Since, in many cases, the individual dyestuffs differ considerably in their properties, in particular in their particle size distribution and their solubility, for example in water, the effectiveness of the dispersing agents is mostly limited to some products. Thus, some ligninsulfonates do not afford sufficient heat stability of the dispersions. Other dispersing agents have the disadvantage of being limited in their effectiveness to the alkaline range or of coloring the fibers themselves, thus being an obstacle to the dyeing of light shades. There are also many dispersing agents which tend to foam and thus adversely affect the dispersing and dyeing operations.

This invention relates to the use of sulfuric acid semi-esters of the formula (1)

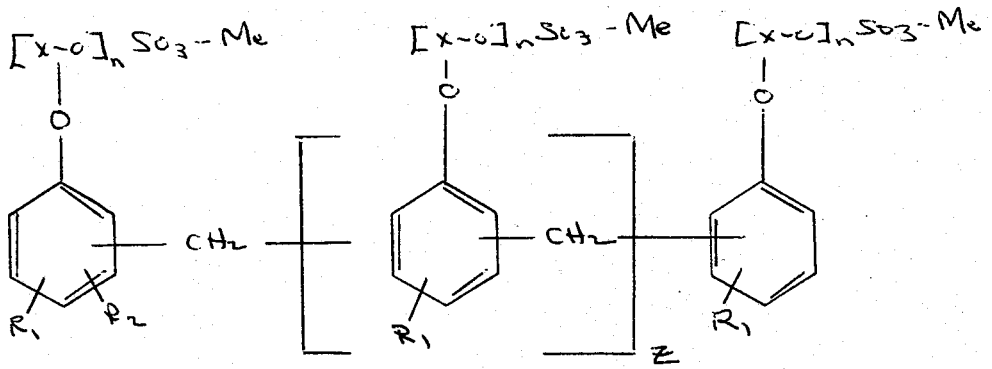

in which X stands for an ethylene or propylene group, $R_1$ for a saturated alkyl group having 4 to 14 carbon atoms, $n$ for an integer of 2 to 25, preferably 3 to 15, $z$ for zero or an integer of 1 to 8, and Me for a hydrogen atom, an alkali metal atom, an equivalent of an alkaline earth metal atom, an ammonium ion or an organic base, for the dispersing of dyes.

The sulfuric acid semi-esters of the formula (1), to be used according to the invention, may be obtained by oxalkylating mono- or polynuclear alkyl-phenols, from which they are derived, and esterifying the oxalkylation products thus obtained, in part or in total, according to known methods to yield the sulfuric acid semi-esters.

As starting products, mononuclear alkyl-phenols, such as octyl-, nonyl-, dodecyl-, tetradecyl-, dibutyl-, dioctyl-, dinonyl-, ditetradecyl-, tributyl-phenols or mixtures thereof as well as polynuclear alkyl-phenols (novolakes) are suitable. They are obtained by acid condensation of monoalkyl-phenols with formaldehyde in a molar ratio of from 2:1 to 10:9. Formaldehyde may be used as an aqueous solution or as paraformaldehyde.

As acid catalysts, there may be used mineral acids, such as sulfuric acid, phosphoric acid or, preferably, hydrochloric acid which can easily be removed during dehydration, in a concentration of from 0.1 to 5 per cent by weight. Condensation is brought about at temperatures of from 20° to 150°C, preferably from 80° to 130°C, under a nitrogen atmosphere. Water produced upon condensation has to be distilled off, finally under reduced pressure (of 50 mm mercury), until the water content in the resin is less than 0.3 per cent.

These novolakes are more or less brittle limpid resins having a yellow-brown color when obtained in large blocks. They consist of mixtures of polynuclear alkyl-phenols linked by means of methylene bridges. Their constitution depends, above all, on the ratio of alkyl-phenol to formaldehyde.

Both the mononuclear and polynuclear alkyl-phenols are oxalkylated with alkylene oxides, for example with 1,2-propylene oxide or, preferably, with ethylene oxide, according to known methods, preferably with alkali metal hydroxides or alkoxides as catalysts, at 100° to 210°C, preferably at 140° to 170°C. The amount of alkylene oxide used is such that 2 to 25 mols of alkylene oxide are introduced per phenolic hydroxy group. When ethylene oxide and 1,2-propylene oxide are used, the two alkylene oxides may be mixed with each other or used alternatingly once or several times, one after the other, for the oxalkylation reaction.

As alkali metal hydroxides, there are suitable potassium hydroxide or, preferably, sodium hydroxide, as alkali metal alkoxides, sodium methylate or ethylate, the concentration being preferably from 0.05 to 1.0% by weight, calculated on the phenol at the beginning of the oxalkylation reaction. The oxalkylation reaction may be carried out without pressure or in autoclaves with propylene oxide or, preferably, ethylene oxide or mixtures thereof and the alkylene oxide being fed in as a gas or a liquid.

The sulfation reaction of the oxalkylation products thus prepared is carried out according to known methods. As sulfation reagent, there may be used gaseous sulfur trioxide diluted with an inert gas or a sulfur trioxide addition product, for example one with dioxan or amidosulfonic acid and chlorosulfonic acid. An inert diluent may also be used, where required, for example methylene chloride. The amount of sulfation reagent used may be such that all, or only part of, the hydroxy terminal groups of the oxyalkylated novolake, but at least one hydroxy terminal group per molecule of the oxyalkylated novolake are reacted.

Whilst the sulfation reaction with amidosulfonic acid yields the ammonium salts of the sulfuric acid semi-esters, the technically interesting sulfation reaction with gaseous sulfur trioxide in an inert gas affords the sulfuric acid semi-esters in the acid form, from which the desired salts can be prepared with corresponding inorganic or organic bases.

This neutralization may be brought about using oxides, hydroxides or carbonates of metals, preferably alkali metal hydroxides, which result in the very readily water-soluble alkali metal salts of the sulfuric acid semi-esters of the invention.

The 15 – 50% aqueous solutions obtained by the preparation of the sulfuric acid semi-esters may be used directly for the production of dyestuff dispersions. It is, however, also possible first to remove water from these solutions, for example by spray-drying. As dyestuffs, there is suitable any sparingly soluble dyestuff and pigment, such as vat dyestuffs and azo dyestuffs, especially disperse dyestuffs. These dyestuffs are mixed while stirring in a dissolver (high-energy stirrer with saw-tooth disk) in the form of press cakes or, in some cases, also in dried form, with the dispersing agents or with aqueous solutions thereof containing as little water as possible, to yield a pumpable suspension, where required the mixture is passed over a corundum disk mill or similar colloid mills for homogenization purposes and then ground generally in a continuously operating stirrer mill containing quartzite beads with a diameter of 1 to 3 mm, optionally in several passages, until the desired fine distribution is reached. After the grinding operation, further additives of bactericides, extenders, such as sugar, further dispersing agents and water may also be incorporated, as it has been done during the mixing, for the final standardization of the paste. For the production of powders, a suitable paste is dried in a spraying tower and then standardized to conform with dhe dry powder type.

The ratio of dispersing agent to dyestuff powder may vary within wide limits and generally ranges from 0.3 to 10.0, preferably from 0.5 to 2 parts by weight of dispersing agent per part of dyestuff powder.

Compared to the dispersing agent disclosed in Fiat Final Report 1013, the dispersing agents of the present invention have a substantially better dispersing effect and tinctorial strength, so that smaller amounts of dispersing agent yield stable dispersions. Owing to the sensitivity of some dyestuffs and fibers in the alkaline range, a great advantage of these dispersing agents is to give a neutral reaction, in contrast to most of the anionic dispersing agents known. It is, therefore, possible also to treat dyestuffs which are sensitive to alkaline agents. It is also possible to combine dispersions prepared with these dispersing agents with other sensitive soluble dyestuffs, for example reactive dyestuffs. Another advantage of the dispersing agents of the invention is their substantially reduced foaming effect, which would otherwise considerably disturb the dispersing operation. Their tendency to staining alone textile material is also very weak. Another substantial advantage of the dispersing agents of the invention, as compared to known dispersing agents, resides in their very good wetting behavior in hot dyeing liquors, as it can be seen from the wetting periods measured according to German Industrial Standards (DIN) 53901 at 20° and 70°C. In the presence of other dispersing agents, their wetting effect on powder, which is stirred at room temperature, is also improved in many cases. All these effects are specific and vary from dyestuff to dyestuff, so that the following Examples can only illustrate the invention without limiting it thereto. The Examples demonstrate the superiority of these compounds both as to their dispersing power, their property of improving stability and their reduced tendency to soiling the fibers.

EXAMPLE 1 a. Preparation of a 2-nuclear novolake 1,100 g of nonyl-phenol, 79 g of paraformaldehyde (of 95% strength) and 11.8 g of concentrated hydrochloric acid were mixed at room temperature and refluxed while stirring for 4 hours under a nitrogen atmosphere. Subsequently, water was distilled off for 4 hours first under atmospheric pressure while raising the internal temperature to 135°C, the pressure was then carefully reduced, and stirring was continued for 2 hours at 135° – 140°C under a pressure of about 20 mm mercury. Yield: 1,121 g of novolake.

b. Oxyethylation

After addition of 4.5 g of freshly pulverized caustic soda, 828 g of the resin were oxyethylated at 150° – 160°C in an autoclave, while stirring and feeding in 1,017 g of ethylene oxide and while maintaining a pressure of about 1 to 2 atmospheres gage. After the total amount of ethylene oxide had been fed in, stirring was continued for 1 hour at 150° – 160°C. The oil obtained corresponded to the 2-nuclear nonyl-phenol novolake with 12.6 mols of ethylene oxide; ($n_D^{25}$ = 1.4989); turbidity point (in butyldiglycol): 81° – 82°C.

c. Sulfation reaction with amidosulfonic acid 867.8 g of the oxyethylation product were mixed with 175.5 g of amidosulfonic acid and 10.9 g of urea and the mixture was stirred for 7.5 hours at 122° – 125°C under a nitrogen atmosphere, whereupon the cream-colored hardly viscous reaction product (ammonium salt of the bis-sulfuric acid semi-ester of 2-nuclear nonyl-phenol novolake oxyethylated with 12.6 mols of ethylene oxide) became soluble in water.

In order to convert it into the sodium salt, 433 g of the ammonium salt were combined with 300 g of water and 470 ml of 1N sodium hydroxide solution and the mixture was heated to 70°C while stirring and feeding in nitrogen, until ammonia was expelled. The sodium salt remaining in the aqueous residue (1,071 g) could be used as a 41% solution or could be isolated by dehydration, advantageously after addition of silicon dioxide.

EXAMPLE 2 a. Preparation of a 3-nuclear novolake 2,200 g of nonyl-phenol, 211 g of paraformaldehyde (of 95%), 24 g of concentrated hydrochloric acid were refluxed while stirring for 4 hours under a nitrogen atmosphere, water was then distilled off for 6 hours under atmospheric pressure, while raising the temperature to 135°C. Pressure was then carefully reduced to 16 mm mercury, and stirring was continued for 2 hours at 135° – 140°C at 16 mm mercury.

Yield: 2,240 g (of a limpid resin which was brittle and had a brown tinge when obtained in a thin layer).

b. Oxyethlation 950 g of 3-nuclear nonyl-phenol novolake and 4 g of sodium hydroxide were oxyethylated with 1,116 g of ethylene oxide as disclosed in Example 1 b).

Yield: quantitative (addition product of 18.3 mols of ethylene oxide on 1 mol of 3-nuclear nonylphenol novolake)

$n_D^{25} = 1.5012$, turbidity point (in butyl-diglycol): 78° – 80°C.

c. Sulfation reaction with gaseous sulfur trioxide 740 g of the oxyethylation product, obtained according to (b) and heated to 120°C, were pumped from the top into a vertical cylinder having a length of about 30 cm and being thermostat-controlled at 40° – 45°C and provided with an internal blade stirrer, and at the same time a mixture consisting of 4 to 5% of sulfur trioxide freshly prepared from sulfur dioxide and air and of 95 to 96% of air was introduced in a ratio of 2 mols of sulfur trioxide per mol of oxyethylation product.

The low-viscosity bis-sulfuric acid semi-ester of the addition product of 3-nuclear nonyl-phenol novolake with 18.3 mols of ethylene oxide thus obtained had an acid number of 63 – 67 (calculated 66.8) and was soluble in water. For converting it into the sodium salt, the pH-value of 548.1 g of the bis-sulfuric acid semi-ester (acid number 63) was adjusted to 7.0 by means of 3,000 g of water and 73 g of a 33% sodium hydroxide solution at room temperature.

2,888 g of this solution were stirred with 221 g of silicon dioxide at room temperature while adding 750 g of water and this suspension was dried by spray-drying. A powder was obtained, which had good flow properties and a residual moisture content of 9% ($H_2O$ according to Fischer) in addition to 32% of silicon dioxide.

EXAMPLE 3

740 g of the addition product of 18.3 mols of ethylene oxide on 1 mol of 3-nuclear nonylphenol novolake as prepared according to Example 2 (a) and (b) were reacted as in Example 2 (c) in a ratio of 3 mols of sulfur trioxide to 1 mol of the addition product. The tris-sulfuric acid semi-ester of the addition product of 3-nuclear nonyphenol novolake with 18.3 mols of ethylene oxide formed (acid number 98 – 105, calc. 98.1) gave a clear solution in water.

723 g of this tris-sulfuric acid semi-ester were neutralized to pH 7.0 at room temperature by means of 159 g of a 33% sodium hydroxide solution while adding 2,850 g of water.

259.1 g of silicon dioxide and 784 g of water were introduced into 2,740 g of this aqueous solution and the mixture was spray-dried. The light-beige powder obtained, having good flow properties, contained, in addition to the sodium salt of the tris-sulfuric acid semi-ester, 3.8% of water and 33.6% of silicon dioxide.

EXAMPLE 4 a. Preparation of a 3-nuclear nonylphenol novolake as in Example 2(a).

b. Oxyalkylation 1.090 g of a novolake resin prepared according to Example 2(a) were reacted as in Example 1(b), after addition of 4 g of sodium hydroxide, first with 554 g of 1,2-propylene oxide at 150° – 160°C and then with 897 g of ethylene oxide at 150° – 160°C. This product corresponded to a block oxalkylation product of 1 mol of 3-nuclear nonylphenol novolake + 6 mols of propylene oxide + 12.8 mols of ethylene oxide.

Yield: quantitative; $n_D^{25} = 1.5017$; turbidity point (in butyldiglycol): 63° – 64°C, it was not soluble in water.

c. Sulfation reaction with chlorosulfonic acid 319 g of this block oxalkylation product were diluted with 250 ml of methylene chloride and then 70.8 g of chlorosulfonic acid were added dropwise at 15° – 20°C, while passing a weak stream of anhydrous nitrogen through the solution, thus removing the escaping hydrogen chloride gas by means of a reflux condenser. Toward the end of the reaction, the mixture was heated to 30°C and stirred until no more hydrogen chloride gas escaped.

After methylene chloride had been distilled off under reduced pressure at 30°C, 375 g of an oil were obtained, which had an acid number of 91 – 94 (calc. 91.5) and a content of 0.04% of titerable chlorine (calc. 0%) as the tris-sulfuric acid semiester of the block condensation product of 3-nuclear nonylphenol novolake + 6 mols of propylene oxide + 12.8 mols of ethylene oxide. Neutralization was performed at pH 7.0 on 370.2 g of the tris-sulfuric acid semi-ester, using 1200 g of water and 75 g of a 33% sodium hydroxide solution.

Yield: 1637 g of a light-brown viscous limpid solution containing 23% of the sodium salt.

EXAMPLE 5 a. Preparation of novolake as in Example 2(a).

b. Oxalkylation

After addition of 4.0 g of sodium hydroxide, 1,082 g of the novolake resin prepared according to Example 2(a) were reacted as in Example 1(b) first with 418 g of ethylene oxide at 150° – 160°C, then with 550 g of 1,2-propylene oxide at 150° – 160°C and finally with 836 g of ethylene oxide at 150° – 160°C.

Yield of the block condensation product of 3-nuclear-nonylphenol novolake + 6 mols of ethylene oxide + 6 mols of propylene oxide + 12 mols of ethylene oxide was quantitative, $n_D^{25} = 1.4946$, turbidity point (in butyl-diglycol): 57° – 58°C.

c. Sulfation reaction with chlorosulfonic acid

After dilution with 250 ml of methylene chloride, 365.2 g of this block oxalkylation product were reacted as in Example 4(c) with 70.6 g of chlorosulfonic acid to yield the tris-sulfuric acid semi-ester of the block condensation product of 3-nuclear nonylphenol novolake + 6 mols of ethylene oxide + 6 mols of propylene oxide + 12 mols of ethylene oxide.

Yield: 420 g of a black-brown oil (acid number 80 – 81, calc. 81.3). 207.8 g of this tris-sulfuric acid semiester were neutralized to pH 7.0 by means of 575 g of water and 36 g of a 33% sodium hydroxide solution.

Yield: 815 g of a brownish yellow limpid 26% solution of the sodium salt.

EXAMPLE 6 a. Preparation of novolake as in Example 2(a).

b. Oxalkylation 694 g of ethylene oxide and 457 g of 1,2-propylene oxide were mixed at about – 5°C in an autoclave. At 140° – 165°C, a mixture of 900 g of 3-nuclear nonylphenol novolake and 4.0 g of sodium hydroxide was oxalkylated with this alkylene oxide mixture as in Example 1(b).

Yield of the mixed condensation product of 3-nuclear nonylphenol novolake + 6 mols of propylene oxide + 12 mols of ethylene oxide was quantitative; ($n_D^{25}$ = 1.4957, turbidity point (in butyl-diglycol): 54° − 55°C).

c. Sulfation reaction with chlorosulfonic acid 400 g of the mixed oxalkylation product were reacted as in Example 4(c), after addition of 250 ml of methylene chloride, with 92 g of chlorosulfonic acid to yield the tris-sulfuric acid semi-ester (see Example 4(c).

Yield: 743 g (acid number: 97, calc. 93.1) of a dark brown limpid oil which was still viscous at 25°C.

200 g of this tris-sulfuric acid semi-ester were reacted as in Example 4(c) with 455 g of water and 41 g of a 33% sodium hydroxide solution to yield the sodium salt.

Yield: 693.5 g of a honey-colored limpid solution containing 29.9% of the sodium salt.

EXAMPLE 7 a. Preparation of a 9-nuclear nonyl-phenol novolake 5,940 g of nonylphenol, 758 g of paraformaldehyde and 50 g of concentrated hydrochloric acid were condensed and treated as in Example 3(a). Yield: 6,290 g of resin.

b. Oxethylation

After addition of 4.0 g of sodium hydroxide, 1,000 g of this resin were oxethylated as in Example 1(b) with 1,145 g of ethylene oxide.

Yield of addition product of 54 mols of ethylene oxide on 1 mol of 9-nuclear nonylphenol novolake was quantitative; ($n_D^{25}$ = 1.5051, turbidity point (in butyl-diglycol): 81° − 82°C.)

c. Sulfation reaction 250 g of the oxethylation product obtained according to (b) were treated as in Example 4(c), at 20° − 25°C, with 59.0 g of chlorosuflonic acid.

Yield: 291 g of 9-sulfuric acid semi-ester of 9-nuclear nonylphenol novolake + 54 mols of ethylene oxide as a dark brown low-viscosity oil, acid number 100 − 103, calc. 97.1; Cl⁻ 0%.

290 g of this sulfuric acid semi-ester were neutralized to pH 7.0 by means of 1,210 g of water and 63.6 g of a 33% sodium hydroxide solution.

Yield: 1,560 g of a dark brown limpid solution containing 19.3% of the sodium salt.

EXAMPLE 8 a. Preparation of a 7-nuclear nonylphenol novolake 5,940 g of nonylphenol, 731 g of paraformaldehyde and 35 g of concentrated hydrochloric acid were refluxed while stirring as in Example 2(a) for 15 hours and worked up as disclosed.

Yield: 6,170 g of a light yellow brittle resin.

b. Oxethylation

After addition of 6.0 of sodium hydroxide, 1,000 g of this product were reacted as in Example 1(b) with 747 g of ethylene oxide.

Yield of the addition product of 27.4 mols of ethylene oxide on 1 mol of 7-nuclear nonylphenyl novolake was quantitative. ($n_D^{25}$ = 1.5184, turbidity point (in butyl-diglycol): 50° − 52°C).

c. Sulfation reaction with chlorosulfonic acid

According to Example 4(c), 164.9 g of the oxethylation product obtained according to (b) in 150 ml of methylene chloride were reacted at 20° − 35°C with 47.7 g of chlorosulfonic acid. After elimination of methylene chloride, 177.0 g of a violetish brown-black paste were neutralized to pH 7.0 by means of 669 g of water and 60 g of a 33% sodium hydroxide solution.

Yield: 906 g of a yellowish, still viscous paste containing 20% of the sodium salt.

EXAMPLE 9 a. Preparation of novolake as in Example 8(a).

Oxethylation 1,074 g of the novolake of Example 8(a), 6.0 g of sodium hydroxide and 2,498 g of ethylene oxide were reacted as in Example 1(b).

Yield of an addition product of 85 mols of ethylene oxide on 1 mol of 7-nuclear nonylphenol novolake was quantitative. ($n_D^{25}$ = 1.4958, turbidity point (in butyl-diglycol) more than 100°C).

c. Sulfation reaction with chlorosulfonic acid.

100 g of the oxethylation product of (b) were treated at at 15° − 40°C, after dilution with 100 ml of methylene chloride, with 15.2 g of chlorosulfonic acid as in Example 4(c). After methylene chloride had been distilled off, 115.5 g of a brown-black low-viscosity oil (acid number 64.4 and 66.7 respectively) were obtained. Neutralization was performed after addition of 262 g of $H_2O$ by means of 16.6 g of a 33% sodium hydroxide solution. 396.5 g of a yellow-brown limpid solution having a pH-value of 7.4 and a content of about 29.9% of sodium salt, were obtained.

EXAMPLE 10 a. Preparation of novolake as in Example 7

Oxethylation 1,000 g of novolake according to Example 7(a), 5.0 g of sodium hydroxide solution and 4,748 g of ethylene oxide were reacted as in Example 1(b).

Yield of the addition product of 224 mols of ethylene oxide on 1 mol of 9-nuclear nonylphenol novolake was quantitative. The wax had a melting point of 38.5° to 40°C, turbidity point (in butyl-diglycol) more than 100°C).

c. Sulfation reaction with chlorosulfonic acid

According to Example 4(c), 200 g of the oxyethylation product of (b) in 200 ml of methylene chloride were reacted, at 15° − 40°C for 5.5 hours, with 17.6 g of chlorosulfonic acid. After methylene chloride had been distilled off, 213.9 g of a sulfuric acid semi-ester were obtained as a dark grey mass which was no longer viscous. After addition of 251 g of water, 212.4 g of this product were neutralized by means of 1N sodium hydroxide solution.

Yield: 648.0 g of a yellow limpid solution (pH 6.9) having a content of about 33.3% of sodium salt.

EXAMPLE 11 a. Preparation of novolake 293.2 g of a distilled mono-n-hexyl-phenol prepared from n-hexane-1, phenol and boron fluoride as a catalyst (boiling point: 92° − 95°C under a pressure of 0.3 to 0.4 mm mercury; $n_D{}^{25} = 1.5105$), 41.5 g of paraformaldehyde and 1.5 g of concentrated hydrochloric aicd were stirred for 1 hour at 40°C, the temperature was raised to 100°C within 1 hour and stirring was continued under reflux for 16 hours. The reaction mixture was worked up as in Example 2(a). 305.5 g of a yellow limpid resin was obtained which was still plastic at room temperature.

b. Oxethylation

After addition of 0.5 g of sodium hydroxide, 150 g of this 5-nuclear n-hexylphenol novolake were reacted without pressure with 189.2 g of ethylene oxide in a glass vessel to yield the addition product of 27 mols of ethylene oxide on 1 mol of 5-nuclear n-hexylphenol novolake as a light yellow limpid oil;
$n_D{}^{25} = 1.5092$, turbidity point (in butyl-diglycol): 68° – 69°C.

c. Sulfation reaction with chlorosulfonic acid

According to Example 4(c), 27.5 g of chlorosulfonic acid were added, at 15° – 20°C, to 100 g of the oxethylation product of (b) in 50 ml of methylene chloride, and the mixture was stirred for 4.5 hours at 25° – 50°C. After methylene chloride had been distilled off, a low-viscosity oil still capable of being poured (acid number 108.5, calc. 110.9) was obtained which, after neutralization with 255 ml of 1N sodium hydroxide solution (pH 7.0), resulted in 375 g of a limpid yellow solution having a content of about 33% of sodium salt.

EXAMPLE 12 a. Preparation of novolake 524.0 g of dodecylphenol ($n_D{}^{25} = 1.5041$), 42.1 g of paraformaldehyde and 3.0 g of concentrated hydrochloric acid were stirred at 25°C for 1 hour, the mixture was heated to 100°C within 3 hours, refluxed while stirring for 16 hours and finally worked up as in Example 2(a).

b. Oxethylation

After addition of 0.5 g of sodium hydroxide, ethylene oxide was introduced, at 160° – 165°C, without pressure into a glass vessel containing 156 g of this red brown resin, until 158.5 g of ethylene oxide had been absorbed.

Yield: 315 g of the addition product of 18.7 mols of ethylene oxide on 1 mol of 3-nuclear dodecylphenol novolake ($n_D{}^{25} = 1.5040$; turbidity point (butyl-diglycol): 79° – 79°C.

c. Sulfation reaction with chlorosulfonic acid

According to Example 4(c), 107 g of the oxethylation product of (b) in 100 ml of methylene chloride were reacted with 21.4 g of chlorosulfonic acid for 3.5 hours at 15° –40°C. After methylene chloride had been removed, 118.6 g of a residue (sulfuric acid semi-ester) were obtained. 118.0 g thereof were neutralized by means of 22.9 g of a 33% sodium hydroxide solution and 372 g of water.

Yield: 513 g of a yellow limpid solution containing 23.8% of sodium salt.

EXAMPLE 13 a. Preparation of novolake 675 g of p-cresol, 1375 g of nonylphenol, 265 g of paraformaldehyde and 15.0 g of concentrated hydrochloric acid were reacted as in Example 12(a) and worked up as in Example 2(a).

Yield: 2,140 g of a very brittle non glutinous resin.

b. Oxyethylation

After addition of 2.0 g of sodium hydroxide, 1032 g of this "mixed novolake" of 3-nuclear p-cresol and nonylphenol (1:1) were oxethylated as in Example 1(b) with 1405 g of ethylene oxide to yield the addition product of 16 mols of ethylene oxide on 1 mol of the mixed novolake of 3-nuclear p-cresol and nonylphenol (1:1); ($n_D{}^{25} = 1.5141$, turbidity point (in butyl-diglycol): 74° – 74.5°C).

c. Sulfation reaction with chlorosulfonic acid 100 g of this oxethylation product dissolved in 100 ml of methylene chloride were reacted for 2.5 hours, according to Example 4(c), with 28.6 g of chlorosulfonic acid at 20° – 40°C. After methylene chloride had been eliminated, the sulfuric acid semi-ester was obtained as a dark low-viscosity paste (acid number: 110.9, calc. 115.1). After addition of 236 g of water, the mixture was neutralized by means of 28.5 g of a 33% sodium hydroxide solution.

Yield: 386 g of a yellow-brown solution containing about 31% of sodium salt.

In the same manner as disclosed in the above Examples, the following compounds were prepared:

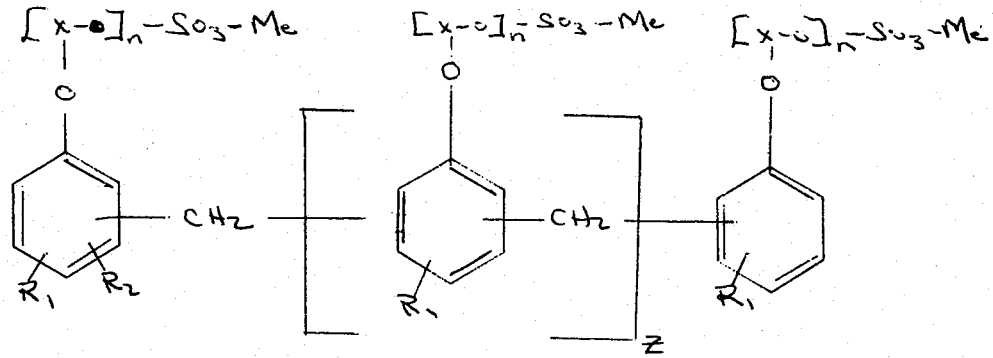

Table I

| Substance No. | $R_1$ | $R_2$ | Z | X-O | EO n | PyO m | Me | preparation according to Example |
|---|---|---|---|---|---|---|---|---|
| 1 | $C_9H_{19}$ | H | 0 | $-A_n-$ | 11.3 | — | Na' | 2,3 |
| 2 | " | " | 1 | " | 18 | — | " | |
| 3 | " | " | 1 | " | 18 | — | $NH_4$ | |
| 4 | " | " | 1 | " | 11.3 | — | Na | |

Table I—Continued

| Substance No. | R₁ | R₂ | Z | X-O | EO n | PyO m | Me | preparation according to Example |
|---|---|---|---|---|---|---|---|---|
| 5 | " | " | 0 | " | 6 | — | " | |
| 6 | " | " | 0 | " | 12,6 | — | " | 1 |
| 7 | " | " | 2 | " | 21,2 | — | " | |
| 8 | " | $C_9H_{19}$ | 0 | " | 10,6 | — | " | |
| 9 | " | H | 1 | " | 84,2 | — | " | |
| 10 | " | " | 5 | " | 28 | — | " | |
| 11 | " | " | 5 | " | 56,6 | — | " | |
| 12 | " | " | 5 | " | 84,2 | — | " | |
| 13 | " | " | 5 | " | 14,20 | — | " | |
| 14 | " | " | 7 | 1 | 54 | — | " | 7 |
| 15 | " | " | 1 | $A_{12}$—$B_6$ | 12 | 6 | " | 4 |
| 16 | " | " | 1 | $A_{12}$—$B_6$—$A_{12}$ | 18 | 6 | " | 5 |
| 17 | " | " | 1 | $(A_{12}B_6)$ statistically | 12 | 6 | " | 6 |
| 18 | $C_9H_{19}$ | H | 1 | —$A_n$— | 224 | — | Na | 10 |
| 19 | n-$C_6H_7$ | H | 3 | —$A_n$— | 27 | — | Na | 11 |
| 20 | n-$C_{12}H_{25}$ | H | 1 | —$A_n$— | 16,7 | — | Na | 12 |
| 21 | $CH_3$ $\}$ $C_9H_{19}$ | H | 1 | —$A_n$— | 16 | — | Na | 13 |

EXAMPLE 14

100 g of the dyestuff of the formula

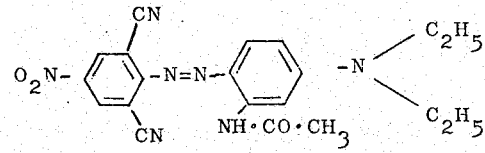

were stirred in a dissolver with 50 g of the dispersing agent prepared in Example 3 and with 30 g of the dispersing agent prepared as disclosed in Fiat Final Report 1013, while adding 100 g of water, and the mixture was ground for about 3 hours in a stirrer mill having quartzite beads of a diameter of 2 mm, until fine distribution was reached. The finished dispersion was standardized to a dry dyestuff content of 30% by adding 30 g of sugar and a condensation product of naphthalene-sulfonic acid and formaldehyde and spray-dried to yield a powder. The powder obtained met with all requirements as to color and dyeing techniques.

EXAMPLE 15

100 g of the disperse dyestuff 1,4-diamino-2-bromo-6-nitroanthraquinone were ground in a stirrer mill, having quartzite beads of a diameter of 2 mm, for about 2.5 hours, with 210 g of a 30% solution of the dispersing agent No. 1 (Table I), until fine distribution was reached. The paste was standardized to the desired dyestuff concentration of 20% by means of water. Its color and dyeing properties were fully satisfactory.

The dispersing agents prepared according to Examples 1 to 13 were compared with the comparative product A, which had been prepared according to FIAT Final Report 1013 from cresol, 2-naphthol-6-sulfonic acid, sodium sulfite and formaldehyde. For a uniform characterization of the dispersing power, the following test methods were used:

Test Method 1

A 0.2% solution of the leuco salt of tetrasulfuric acid ester of 3,3'-dichloro-indanthrenazine was decomposed, while stirring at high speed, by means of sulfuric acid and nitrite, so that the insoluble dyestuff precipitated. In the presence of the dispersing agents to be tested in amounts which increased from test to test, the dyestuff was more or less perfectly dispersed. The amount required for this purpose could easily by determined, for example using flow samples (1 ml of the dispersion was allowed to flow out on a filter paper) or by means of a microscope, and compared to that of other dispersing agents.

Allowing the dispersions to be stored especially at elevated temperatures and checking them after a prolonged period of time revealed the stability behavior of the dispersing agents.

This test method was operated at a pH-value of 1 to 2.

Test Method 2

A corresponding test on the dispersing agents in the alkaline range at pH 11 to 12 was carried out by saponification of the dyestuff disclosed in Example 4 of British Pat. No. 998,917, the coupling product of 2-bromo-aniline-4β-hydroxyethylsulfone-sulfuric acid ester with diphenylamine.

Test Method 3

Within the neutral range of pH 6 to 7, the dispersing agents could also be tested by coupling the diazonium salt of 2-methyl-5-chloro-aniline with β-hydroxy-naphthoic acid-2-methyl-anilide likewise in the presence of different dispersing agents.

Test Method 4

For making comparative grinding tests, 4 g of dyestuff were ground, while cooling, with the dispersing agent to be tested, water and 50 g of silica-quartzite beads having a diameter of 1 mm, using a two-disk mill, similar to the conventional stirrers used in stirrer mills, in a small cylinder provided with a laboratory-scale stirring motor. The course of being finely distributed was checked at regular intervals by means of flow samples and microscopic examination and evaluated according to a 5-point scale (1 = very poor, 5 = very good). The stability on storage could be evaluated after having diluted the samples to the desired dyestuff concentration, having stored them at 50°C in a drying cabinet and having repeated the elution sample checking after a storage period of, for example 1, 3 and 6 weeks.

In the following Table, the results of the tests 1 to 3 are meant to be the ratio of dyestuff to dispersing agent, at which the dyestuff is entirely dispersed. For test method 4, the quality of the dispersion is described for the indicated grinding period of at most 3 hours. The surface-active properties of the dispersing agents used are enlisted in the following four columns.

The surface tension was determined in a 0.5% aqueous solution according to a determined method, by which the dispersion drops off a ring.

The wetting period according to German Industrial Standards (DIN) 53901 indicates the time required for a dry cotton slip to be immersed in a 0.2% solution of the dispersing agent at 20° and 70°C.

The result of these tests is shown in Table II. As a comparative dyestuff, 1,4-diamino-2-bromo-6-nitroanthraquinone was used for the present tests.

TABLE II

| | 1 | 2 | 3 | 4 | Test Method | | | |
|---|---|---|---|---|---|---|---|---|
| Substance No. | Dyestuff pH = 3 | dispersing agent pH = 11 | pH = 7 | grinding time/hr | dispersion quality | surface tension dyn/cm | wetting period at 20°C /sec./ | at 70°C /sec./ |
| Comparative product A | 1:2 | 1:2 | 1:0.4 | 3 | 3-4 | 65 | - | - |
| 1 | 1:0.5 | 1:1 | 1:0.4 | 2 | 4-5 | 38.2 | - | - |
| 2 | 1:1 | 1:1 | 1:0.4 | 2 | 4-5 | 37 | - | - |
| 3 | 1:0.5 | 1:1 | 1:0.4 | 3 | 4-5 | 41 | - | - |
| 4 | 1:0.5 | 1:0.5 | 1:0.4 | 3 | 1-2 | 37.6 | - | 300 |
| 5 | 1:1 | 1:0.5 | 1:0.25 | 1 | 4-5 | 40 | 100 | 30 |
| 6 | 1:0.5 | 1:0.5 | 1:0.4 | 1-2 | 5 | 39.5 | 21 | 64 |
| 7 | 1:0.5 | 1:0.5 | 1:0.25 | 2 | 5 | 40.5 | 32 | 126 |
| 8 | 1:0.5 | 1:0.5 | 1:0.4 | 1 | 5 | 39.6 | - | - |
| 9 | 1:0.5 | 1:0.5 | 1:0.4 | 2 | 5 | | | |
| 10 | 1:0.5 | 1:0.2 | 1:0.4 | 2 | 5 | | | |
| 11 | 1:1.5 | 1:0.5 | 1:0.125 | 2 | 5 | | | |
| 12 | 1:0.5 | 1:2 | 1:0.25 | 2 | 5 | | | |
| 13 | 1:0.5 | 1:0.5 | 1:0.4 | 2 | 5 | | | |
| 14 | 1:0.5 | 1:0.5 | 1:0.13 | 2 | 4-5 | 48 | | |
| 15 | 1:1.5 | 1:1.5 | 1:0.125 | 4 | 2-3 | | | |
| 16 | 1:1.5 | 1:0.5 | 1:0.125 | 4 | 4 | | | |
| 17 | 1:1.5 | 1:0.5 | 1:0.125 | 4 | 5 | | | |
| 18 | 1:0.5 | 1:1 | 1:0.4 | 2 | 5 | | | |
| 19 | 1:1 | 1:0.5 | 1:0.125 | 3 | 4 | | | |
| 20 | 1:0.5 | 1:0.5 | 1:0.125 | 2 | 3-4 | | | |
| 21 | 1:0.5 | 1:0.5 | 1:0.125 | 3 | 2-3 | | | |

We claim:

1. A dyestuff and pigment dispersion containing, as the dispersing agent, a sulfuric acid semi-ester of the general formula

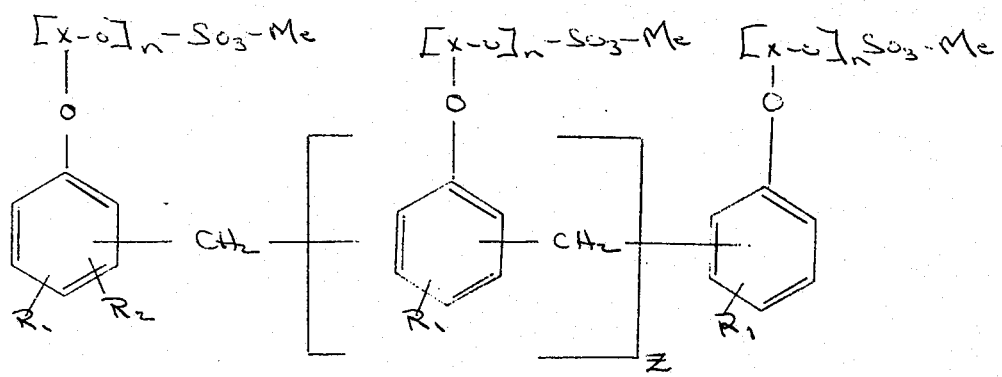

in which X stands for an ethylene or propylene group, $R_1$ for a saturated alkyl group having 4 to 14 carbon atoms, $R_2$ for a hydrogen atom or a saturated alkyl group having 4 to 14 carbon atoms, $n$ for an integer of 2 to 25, preferably 3 to 15, Z for zero or an integer of 1 to 8 and Me for a hydrogen atom, an alkali metal atom, an equivalent of an alkaline earth metal atom, an ammonium ion or the radical of an organic base.

2. A process for the preparation of a dyestuff and pigment dispersion as claimed in claim 1, wherein the dyestuff or pigment is ground in the presence of an aqueous solution of a sulfuric acid semi-ester of the formula specified in claim 1.

* * * * *